United States Patent [19]

Gee

[11] Patent Number: 4,796,351

[45] Date of Patent: Jan. 10, 1989

[54] GASKETS

[75] Inventor: Colin Gee, Mirfield, England

[73] Assignee: Flexitallic Limited, Manchester, England

[21] Appl. No.: 494,015

[22] Filed: May 12, 1983

[30] Foreign Application Priority Data

May 18, 1982 [GB] United Kingdom ............... 8214453

[51] Int. Cl.⁴ .............................................. B81D 39/00
[52] U.S. Cl. ..................................... 29/455.1; 277/227
[58] Field of Search ....................... 29/456, 469.5, 505, 29/455 R; 277/1, 227, 229, 230, DIG. 6; 267/166, 167, 61 R

[56] References Cited

U.S. PATENT DOCUMENTS

| | | | |
|---|---|---|---|
| 1,749,117 | 3/1930 | Weichsel | 267/166 X |
| 3,711,917 | 1/1973 | Baumgras | 267/166 X |
| 3,884,447 | 5/1975 | Alexander et al. | 267/166 X |
| 3,905,090 | 9/1975 | Painter . | |

FOREIGN PATENT DOCUMENTS

| | | | |
|---|---|---|---|
| 69124 | 4/1982 | Japan | 267/166 |
| 1269894 | 4/1972 | United Kingdom . | |

*Primary Examiner*—Howard N. Goldberg
*Assistant Examiner*—Joseph M. Gorski
*Attorney, Agent, or Firm*—Nixon & Vanderhye

[57] ABSTRACT

An annealed, high tensile strength, heat hardenable metal strip is shaped into a spiral wound gasket profile prior to heat treating the strip to harden it and then winding it with a strip of sealing material into a spiral wound gasket.

1 Claim, No Drawings

GASKETS

This invention relates to spiral wound gaskets. Such gaskets are well-known; their key feature is the use of a profiled metal strip wound into a spiral with an interleaved strip of a sealing material such as ptfe, paper or graphite foil. Typical profiles include at least one groove or channel extending lengthwise of the strip, formed by a rolling operation. Such a profile will hereinafter be termed a spiral wound gasket profile.

The resultant spiral wound gasket is clamped between parts to be joined so that the edges of the profiled metal strip contact the respective parts. The clamping force is applied in a direction normal to the plane of the spiral so that the latter is compressed in the same direction by elastic deformation of the strip about the groove or channel constituting the gasket profile referred to above. In use, thermal and/or pressure cycling of the joint causes changes in the clamping force. The elasticity of the spiral wound gasket is usually such that these changes are accommodated without difficulty, at least in conventional pipe joints.

Where complex assemblies are involved and the range of thermal and/or pressure cycling movement is relatively great, the conventional spiral wound gasket may be incapable of exhibiting a sufficient degree of elastic recovery. It has been proposed to use spiral wound gaskets in tandem in an attempt to overcome this problem, but where the thermal/pressure cycling movement is extreme there is a need for a spiral wound gasket with higher than usual elastic recovery capability. Elastic recovery in this context refers to the extent to which the spiral wound gasket can be compressed axially without causing permanent deformation. It is a measure of the ability of a spiral wound gasket to accommodate relative movement between the parts joined by the gasket.

Whilst high elastic recovery metals are available, they do not lend themselves to conventional gasket manufacturing processes since the high elastic recovery properties can only be developed by subjecting the metal to heat treatments which are too severe for the sealing materials used. Unfortunately, it is not practicable to heat treat before profiling and winding the metal strip to form a spiral wound gasket, because the treated metal is relatively intractable.

According to the present invention a spiral wound gasket is made by the steps of shaping an annealed high tensile strength, heat hardenable metal strip into a spiral wound gasket profile, followed by heat treating the strip to harden it, prior to winding it with a strip of a sealing material to form a spiral wound gasket. The strip may be coiled after profiling, so as to reduce the size of heat treatment chamber needed. The heat treatment will usually be carried out in a vacuum, so that the size of the chamber is an important practical factor. Particularly preferred metals are based on alloy steels of the heat hardenable kind, such as Inconel X750, or Armco 17/7 PH (precipitation hardened) stainless steel.

The use of high tensile, heat-hardenable material according to the invention gives a spiral wound gasket having excellent elastic recovery, allied to high resistance to compression. It enables the manufacture of such gaskets of relatively large diameters, for example one or more metres in diameter. Even if the sealing material could withstand a heat treatment sufficient to harden the metal strip, it would require the use of a vacuum chamber large enough to accommodate the gasket. The method of the invention enables the metal strip to be heat treated in the form of a coil of much smaller diameter.

The invention will now be briefly described with reference to the following example. A spiral wound gasket was made by profiling a narrow strip of annealed (condition "A") ARMCO 17/7 PH stainless steel into a shallow V cross-section (lengthwise of the strip).

The profiled strip was loosely coiled and placed in a vacuum furnace and subjected to a standard heat treatment involving controlled heating and cooling, followed by further heating to precipitation harden the strip (to condition TH1050). Conditions 'A' and TH1050 are terms used by the manufacturers to describe the physical properties of the metal.

After cooling in air, the profiled strip was wound with a strip of graphite foil to form a standard 4 inch nominal bore Class 600 spiral wound gasket in which the graphite foil constituted the interleaved sealing material.

The resultant gasket was assembled into a conventional guide ring and tested for elastic recovery under thermal/pressure cycling conditions on a conventional gasket test rig. The elastic recovery was found to be substantially greater than that of a similar gasket made by conventional means using ordinary stainless steel grade 316-L. In both cases, the sealing performance of the gasket was carefully monitored to ensure comparability of the tests.

The test routine was first of all to compress the gasket down to the thickness of its supporting outer guide ring. The inside of the gasket was also pressurised to 1480 psi in accordance with ANSI Basic Specification B 16.5. The load require to do this was 120 tons for the conventional gasket and 140 tons for the gasket made according to the invention. The load was then progressively reduced to 10 tons whilst monitoring for leakage and for elastic recovery relative to the original uncompressed thickness. The conventional gasket recovered 7 thousandths of an inch; the gasket according to the invention recovered 10 thousandths of an inch. The improvement in recovery was in excess of 40%, a most satisfactory result.

I claim:

1. A method of making a spiral wound gasket having improved elastic recovery comprising the steps of:
   (1) profiling a strip of an annealed high tensile strength, precipitation hardening grade of alloy steel strip into a spiral wound gasket profile, followed by
   (2) heat treating the strip and thereafter
   (3) winding and interleaving it with a strip of a sealing material into a spiral wound gasket.

* * * * *